United States Patent [19]

Minart

[11] 4,322,138

[45] Mar. 30, 1982

[54] SUPPORT MEMBER FOR GLASSES FRAME, SPECIALLY FOR USE UNDER HELMET

[75] Inventor: François Minart, St. Germain-en-Laye, France

[73] Assignee: Essilor International Cie Generale d'Optique, Creteil Cedex, France

[21] Appl. No.: 123,460

[22] Filed: Feb. 21, 1980

[30] Foreign Application Priority Data

Feb. 23, 1979 [FR] France ................................ 79 04718

[51] Int. Cl.³ .......................... G02C 3/00; G02C 5/02
[52] U.S. Cl. ...................................... 351/155; 351/133
[58] Field of Search ............... 351/155, 158, 121, 133, 351/134, 135, 106

[56] References Cited

U.S. PATENT DOCUMENTS 3,713,732  1/1973  Gooch ............................ 351/121 X
3,787,113  1/1974  Shedrow ........................ 351/158 X
4,179,753  12/1979  Aronberg et al. .............. 351/155 X Primary Examiner—John K. Corbin
Assistant Examiner—Rodney Bovernick
Attorney, Agent, or Firm—Charles E. Brown

[57] ABSTRACT

The invention relates to a support adapted to receive, in movable manner, a glasses frame portion and comprising for this purpose assembly means of the push-button type. According to the invention, these assembly means are integral with the support in question (which is a horizontal bar in the embodiment shown by way of example), being moulded in one piece therewith; they comprise a support plate drilled with a hole and a hinged retaining tab provided with a projecting lug which fits the hole. Application particularly to glasses for use in sports, worn under a helmet.

15 Claims, 9 Drawing Figures

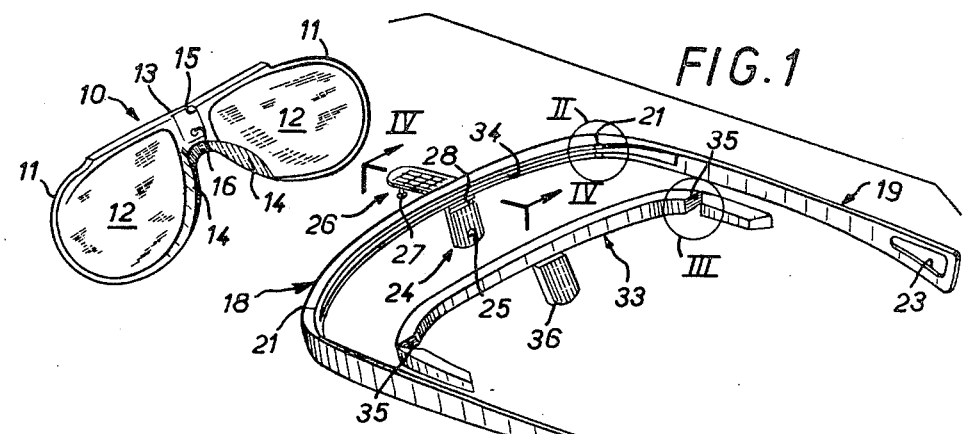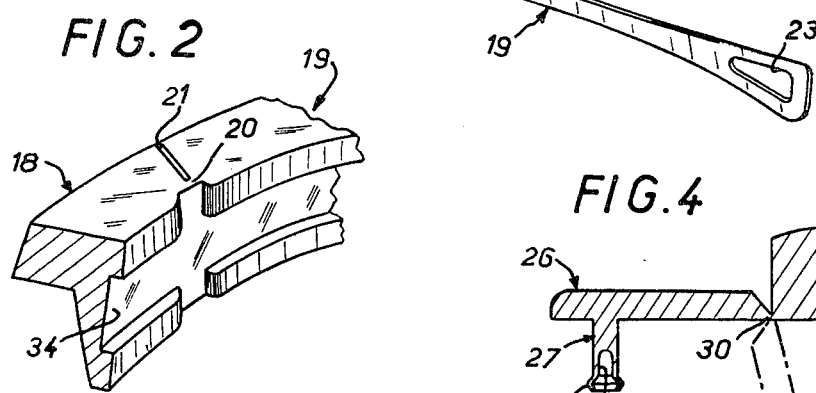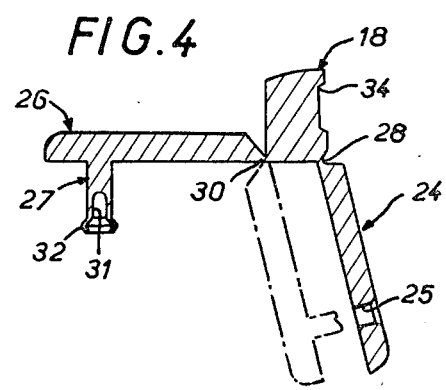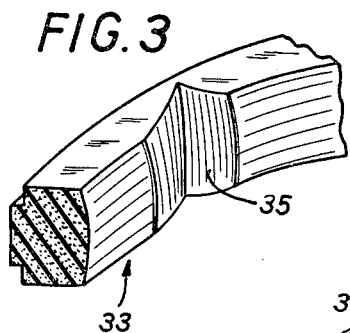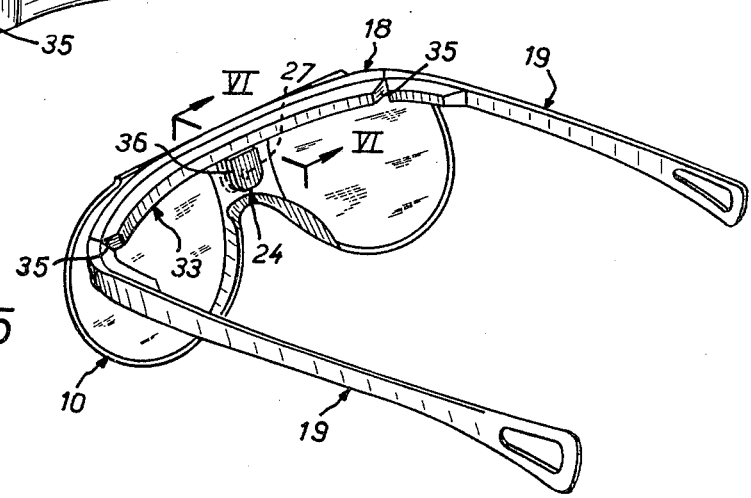

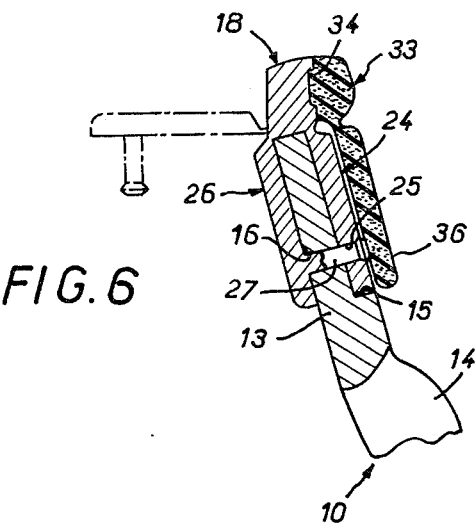
FIG. 6
FIG. 7
FIG. 8
FIG. 9
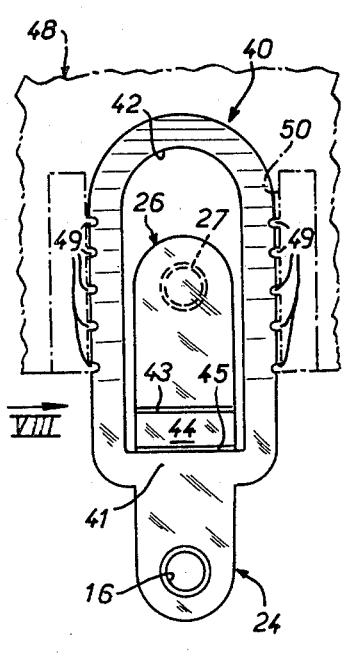
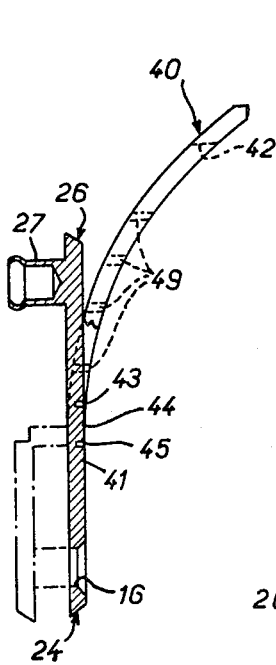
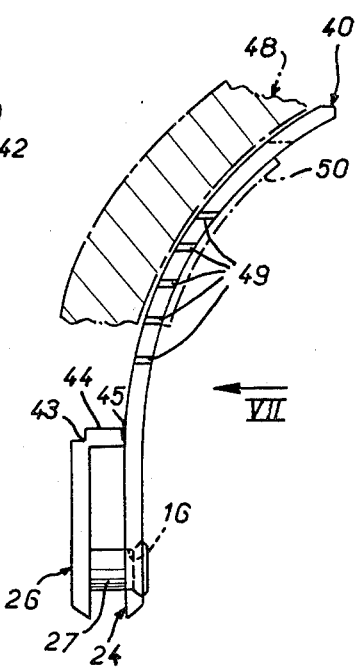

SUPPORT MEMBER FOR GLASSES FRAME, SPECIALLY FOR USE UNDER HELMET

The present invention relates generally to glasses intended to be worn with a helmet, as in certain sports, particularly sports involving motorcycling and driving, and in skiing.

For use with a helmet in this way, it is important that the dimensions of these glasses should be minimal, and it is desirable that the frame portion, usually an eyepiece holder, should be able to be changed when necessary, for example to suit the ambient sunshine level.

In this connection, it has already been proposed that this frame portion be dissociated from the rest of the frame of the glasses, so that this portion can then be individually mounted in removable manner on a support which constitutes the rest of the frame for the glasses and which can be designed in accordance with the particular uses envisaged.

This is the case, in particular, with the glasses described in French Pat. No. 839.015, which are adapted to be worn under a gas mask and wherein the support is reduced to a curved plate on which any desired frame portion constituting an eyepiece-holder can be detachably mounted by friction mounting.

This is also the case with certain sports goggles, particularly those adapted for use in skiing, wherein the frame portion, which in this case is reduced to a single, optionally tinted, transparent plate, is movably mounted, by a push button-type assembly, on a suitable support.

In the supports for glasses frames which have thus been known up till now, the assembly means by which a frame portion can be removably fitted usually consist of separate parts suitably mounted on a support of this kind.

The resulting manufacturing costs are considerable.

In U.S. Pat. No. 3,713,732, the assembly means used, which are of the latching type rather than the push-button type, are integral with the support for the glasses frame portion described therein.

However, the construction is delicate and complex and not reliable in operation.

This invention relates generally to a support for a glasses frame portion which is simple in construction and reliable in operation.

More precisely, it relates to a support for a glasses frame portion of the type comprising push button assembly means adapted to mount such a frame portion removably thereon and integral with said support, having been moulded in one piece with said support, and characterised in that said assembly means comprise a support plate and a retaining tab, said retaining tab being hinged between a raised resting position in which it is spaced from the support plate and a folded-down operating position in which it extends substantially parallel to the support plate, and in that either the support plate or the retaining tab is drilled with a hole whilst the other of these two parts is provided with a projecting lug which fits this hole and is adapted to engage therein for the folded position of the retaining tab.

According to a particular embodiment, a support of this kind may be reduced to a single horizontal bar to which two lateral arms are connected, optionally in one piece, so that the entire assembly has an overall appearance similar to that of a conventional glasses frame, but readily able to fit under a helmet, thanks to its small dimensions.

According to another particular embodiment, the support according to the invention is reduced to a vertical flap provided with fixing means adapted to permit attachment to a helmet, and, according to a further development of this arrangement, it may even form an integral part of such a helmet.

Whatever the case, the assembly means which it comprises for the attachment of a glasses frame portion are produced by moulding in one piece therewith, and therefore it is advantageously relatively cheap to produce.

The features and advantages of the invention will in any case become apparent from the following description, by way of example, referring to the accompanying schematic drawings, wherein:

FIG. 1 is an exploded perspective view of glasses using a support according to the invention, in a first embodiment;

FIGS. 2 and 3, respectively, show, on a larger scale, details of construction marked by the insets II and III in FIG. 1;

FIG. 4 is a cross section through the support according to the invention, on a larger scale, on the line IV—IV in FIG. 1;

FIG. 5 is a perspective view, in the assembled position, of the glasses shown in FIG. 1;

FIG. 6 is a cross sectional view of these glasses, analogous to the view in FIG. 4, on the line VI—VI in FIG. 5;

FIG. 7 is an elevation, in the direction of the arrow VII in FIG. 9, of another support for a glasses frame portion according to the invention, in a second embodiment;

FIG. 8 is a cut-away side view of this support in the direction of the arrow VIII in FIG. 7;

FIG. 9 is another side view of this support, showing its method of use.

These drawings show, by way of example, the application of the invention to the support for a glasses frame portion 10 which itself constitutes an eyepiece-holder; in the embodiment shown, this frame portion comprises, in the conventional manner, two surrounds or circles 11, each adapted to receive an ophthalmic lens 12 and connected to each other in one piece to form, jointly, a bridge or nose 13, whilst the surrounds 11 each also comprise, at the base of the bridge 13, and on each side of this bridge, nose rest members 14.

The structure of a frame portion 10 of this kind is well known per se, and as it is not part of the present invention it will not be described in detail here.

According to the invention, and for reasons which will become apparent later, the bridge 13 of this frame portion 10 comprises, in the embodiment shown, a recess 15 and in the contour of this recess 15 it is drilled transversely with a hole or passage 16.

In the embodiment shown in FIGS. 1 to 6, the support 18 provided for supporting this glasses frame portion 10 is reduced to a single horizontal bar which is slightly curved and to which two side arms 19 are connected.

In practice, in the embodiment shown, the side arms 19 are in one piece with the horizontal bar 18, and are each connected to the bar 18 (FIG. 2) only by a zone of reduced thickness 20, forming a hinge, provided at right angles to a slot 21 opening towards the front, in order to permit them to fold back over the rear surface of the horizontal bar 18.

The assembly thus formed by this horizontal bar 18 and the side arms 19 may, for example, be produced by moulding, from any suitable synthetic material, especially polypropylene.

Preferably, the hinge zones 20 are provided so that the side arms 19 can be folded back without being superimposed, and the articulation axes which they form are therefore slightly oblique relative to one another for this purpose.

In the embodiment shown, the side arms 19 are substantially rectilinear and at their free ends they each comprise an opening 23 for the attachment of an elastic band or other tying means, for example.

To enable the frame portion 10 to be mounted removably thereon the support which is formed by the horizontal bar 18 is provided with assembly means of the push-button type.

According to the invention, these assembly means are integral with a support of this kind, having been moulded in one piece therewith.

In the embodiment shown, they comprise a support plate 24 which is drilled with a hole 25, and a retaining tab 26 which is provided with a projecting lug 27.

In practice, in the embodiment shown, the support plate 24 itself forms a tab the contour of which is adapted to that of the recess 15 in the frame portion 10, its passage 25 also corresponding to that 16 of the recess, and which projects downwards on to the rest of the support formed by the horizontal bar 18, being connected to this bar by a zone of reduced thickness 28, along the rear lower ridge of the bar, this zone of reduced thickness being intended to act as a hinge, in case of impact, and thus avoid the usual rigidity between the frame portion and its support.

In the embodiment shown in FIGS. 1 to 6, the retaining tab 26 is also connected directly to the rest of the support which is formed by the bar 18, by a zone of reduced thickness 30, along the lower front ridge of this bar, but in the case of this retaining tab 26 this zone of reduced thickness 30 constitutes an operational hinge.

The retaining tab 26 is thus hinged between a raised waiting position, shown by solid lines in FIGS. 1 and 4, wherein it is spaced from the support plate 24, and a folded-down operating position, shown by broken lines in FIG. 4 and by solid lines in FIG. 6, in which it extends substantially parallel to the support plate 24, with its lug 27 then engaging in the hole 25 in this support plate.

In the embodiment shown, this lug 27 is axially drilled with a blind recess 31 and, on the outside, at its free end, it comprises a projecting bead 32 adapted to latch it, by simple elastic deformation, in the hole 25 which it is adapted to fit.

In the embodiment shown in FIGS. 1 to 6, the horizontal bar 18 is also fitted, on its rear surface, with a flexible cushion 33 which also extends slightly over the side arms 19.

In practice, the bar 18 and the side arms 19 comprise a groove 34 for accommodating this flexible cushion.

A flexible cushion of this kind, which may be made in one piece from any expanded synthetic material and which is simply fixed by glueing, for example, to the horizontal bar 18 and arms 19, has an overall form which duplicates that of the bar and part of the arms 19, and comprises, at right angles to the hinge zone 20 of each of the arms, a V-notch 35, opening towards the rear, to enable it to fold at the same time as the corresponding side arm 19.

It also comprises a tab 36 adapted to fit the support plate 24 and coupled thereto.

As will readily be understood, the support for the glasses frame portion as described above fits easily under a helmet, thanks to its small dimensions.

Moreover, it is easy to fit any desired frame portion 10 thereto, in removable manner, whether it be a frame portion fitted with corrective lenses or a frame portion fitted with simple sunglass lenses.

In fact, the retaining tab 26 merely has to be raised, then the frame portion 10 in question has to be engaged with its recess 25 on the support plate 24 and the retaining tab 26 has to be folded back until its lug 27 engages in the hole or recess 25 of the support plate 24, after passing through the hole 16 of the frame portion 10.

According to the embodiment shown in FIGS. 8 and 9, the support according to the invention is reduced to a simple substantially vertical flap 40.

In front elevation (FIG. 7), this flap 40, in the embodiment shown, has the general appearance of a handle connected to a horizontal bar 41; in side elevation (FIG. 8) it is slightly curved.

As before, it is provided with assembly means of the push button type formed in one piece by moulding therewith, and thus integral therewith.

The support means consist of a support plate 24 which is analogous to that described hereinbefore and thus comprises a hole or recess 26 and projects downwards relative to the horizontal bar 41, and of a hinged retaining tab 26 which is also analogous to that described hereinbefore and therefore comprises a projecting lug 27 which matches that of the hole 26 of the support plate 24.

In the embodiment shown, the retaining tab 27 is formed by means of the internal recess 42 of the flap 40, on an extension of the support plate 24 and, via a zone of reduced thickness 43 forming a hinge, it is connected to a part 44 of the support 40, forming a spacing crosspiece, which is itself connected to the rest of this support, in practice to the horizontal bar 41 thereof, via a zone of reduced thickness 45 forming a hinge.

The flap 40 which in this case constitutes the support for the glasses frame portion according to the invention is preferably provided with attachment means adapted to fix it to a helmet 48, as diagrammatically shown by broken lines in FIGS. 7 and 9.

In the embodiment shown, these attachment means comprise at least one recessed catch 49, and in practice a series of such catches, on at least one of the lateral sections of the flap 40, and in practice on each of these sections.

These recessed catches 49 are adapted to cooperate with complementary catches in relief, not shown in the drawings, which are provided for this purpose on at least one of the sides of a groove 50 in the helmet 48 which is to be fitted, the flap 40 being able to engage slidingly in this groove.

It is therefore easy to adjust the flap in its position on the helmet 48.

Obviously, it is also possible to use other attachment means, in addition to or instead of those described hereinbefore.

As a variant, the flap 40 may be permanently attached to the helmet 48 and form an integral part thereof.

Moreover, this invention is not limited to the embodiments described and shown, but covers, in particular, all variants of construction and/or combinations of the various elements thereof.

Furthermore, if, in the foregoing description, it is the support plate 24 which comprises a hole and the retaining tab 26 which comprises a complementary lug, a reverse arrangement could be adopted, wherein the lug is carried by the support plate and the hole is formed in the retaining tab.

Finally, a hole of this kind could be replaced by a blind recess adapted to receive the lug which complements it.

Finally, in the manner known per se, the frame portion to be fitted to the support according to the invention may be reduced to a single plate.

The embodiments of the invention, for which exclusive property rights or privileges are claimed, are defined as follows:

1. A support for an eyeglass frame front having a lug receiving aperture therein, said support having push-button assembly means in one piece molded construction with the support for mounting the eyeglass frame front on said support, said push-button assembly means comprising a support plate and a retaining tab, hinge means for hingedly mounting the retaining tab on said support plate for movement between a raised inoperative position and a lowered operative position, said retaining tab being spaced away from said support plate in said raised position and substantially parallel to said support plate in said lowered position, a selected one of said support plate and said retaining tab having a projecting lug and the non-selected one of said support plate and retaining tab having aperture means cooperable with said projecting lug in said lowered position of said retaining tab, said projecting lug also being adapted to extend through the lug receiving aperture in the eyeglass frame whereby upon closure of said assembly means through the lug receiving aperture of the eyeglass frame front the latter is secured on said support.

2. A support according to claim 1, wherein said projecting lug is formed on said retaining tab.

3. A support according to claim 1 or 2, wherein said projecting lug and said aperture means define detent means, said detent means including an enlarged annular bead on said lug and a generally axial blind bore extending into said lug, the diameter of said aperture means being smaller than that of said annular bead undeformed.

4. A support according to claim 1 or 2, wherein said hinge means comprises a zone of reduced thickness directly connecting said retaining tab to said support.

5. A support according to claim 1 or 2, wherein the hinge means comprises a zone of reduced thickness connected to a spacer member on said support, which in turn is connected by a zone of reduced thickness defining other hinge means.

6. A support according to claim 1 or 2, wherein hinge means define by a zone of reduced thickness connects said support plate to said support.

7. A support according to claim 1 or 2, wherein said support comprises a horizontal bar.

8. A support according to claim 7, wherein said support further comprises side pieces integrally formed with the horizontal bar.

9. A support according to claim 1, wherein said support comprises a vertical flap having means for securing it to a helmet.

10. A support according to claim 9, wherein said flap is slidably mounted in a groove in the helmet, the means for securing the vertical flap to the helmet comprising at least one detent on at least one section of said flap cooperable with a complementary detent on the sides of the groove in the helmet.

11. A support according to claim 9 or 10, wherein said flap is curved.

12. A support according to claim 9 or 10, wherein said flap is of handle shape.

13. A support according to claim 9 or 10, wherein said support is permanently fixed to the helmet.

14. A support according to claim 13, wherein said support is integrally formed with the helmet.

15. A support according to claim 1, wherein said support forms parts of eyeglasses including an eyeglass frame front having a lug receiving aperture therethrough, and said lug extending into said frame front aperture.

* * * * *